(12) United States Patent
Schwesig

(10) Patent No.: US 6,736,433 B2
(45) Date of Patent: May 18, 2004

(54) DEVICE FOR LOCKING AT LEAST TWO PROTECTIVE DOORS OF AN INDUSTRIAL MACHINE

(75) Inventor: Günter Schwesig, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/229,329

(22) Filed: Aug. 27, 2002

(65) Prior Publication Data

US 2003/0052489 A1 Mar. 20, 2003

(30) Foreign Application Priority Data

Aug. 27, 2001 (DE) .......................... 101 41 835

(51) Int. Cl.$^7$ ................................ E05C 1/06
(52) U.S. Cl. ............... 292/144; 292/DIG. 46; 292/302; 292/341.15
(58) Field of Search ................ 292/138, 144, 292/DIG. 46, DIG. 53, 32, 33, 156, 302, 341.15, DIG. 21; 70/432, DIG. 65, DIG. 59, DIG. 63, 278.7; 49/449, 103, 142; 40/491

(56) References Cited

U.S. PATENT DOCUMENTS

| | | | | |
|---|---|---|---|---|
| 1,955,525 A | * | 4/1934 | Bales | .......................... 292/33 |
| 3,309,816 A | * | 3/1967 | Malone | ........................ 49/127 |
| 4,930,836 A | * | 6/1990 | Grinn | .................... 296/146.11 |
| 5,197,771 A | * | 3/1993 | Kaup et al. | ..................... 292/45 |
| 5,241,787 A | * | 9/1993 | Norman | .......................... 49/16 |
| 6,367,852 B1 | * | 4/2002 | Aspenwall | .................. 292/285 |
| 6,374,651 B1 | * | 4/2002 | Thielmann et al. | ........... 70/210 |

FOREIGN PATENT DOCUMENTS

| | | | |
|---|---|---|---|
| DE | 298 12 820 U1 | 10/1998 | |
| DE | 198 09 246 A1 | 9/1999 | |
| DE | 200 21 938 A1 | 7/2001 | |
| EP | 1087079 A1 | * 3/2001 | ........... E05B/47/00 |
| JP | 2001165393 A | 6/2001 | |

* cited by examiner

Primary Examiner—Robert J. Sandy
Assistant Examiner—Dinesh N Melwani
(74) Attorney, Agent, or Firm—Henry M. Feiereisen

(57) ABSTRACT

A device for locking at least two protective doors of an industrial machine, in particular an injection molding machine, is disclosed. The device includes a momentary contact switch, a sensor device for recognizing a closed state of the protective doors and a mechanical lock with an actuator that engages with an associated receiving device on one door. At least one non-energizable actuator is provided that engages with a receiving device associated with another protective door. In this way, several protective doors can be locked simultaneously, in particular a closing door and a discharge door of an injection molding machine.

10 Claims, 2 Drawing Sheets

DEVICE FOR LOCKING AT LEAST TWO PROTECTIVE DOORS OF AN INDUSTRIAL MACHINE

CROSS-REFERENCES TO RELATED APPLICATIONS

This application claims the priority of German Patent Application Serial No. 101 41 835.3, filed Aug. 27, 2001, the subject matter of which is incorporated herein by reference.

FIELD OF THE INVENTION

The invention relates to a device for locking at least two protective doors of an industrial machine, in particular the doors of an injection molding machine.

BACKGROUND OF THE INVENTION

Many machines have protective doors to protect bystanders and operators of these machines. The protective doors should be allowed to open only when the process does no longer pose a risk. Otherwise, opening the protective doors when the machine is running will trigger an emergency stop. When all protective doors are closed, the state of the machine is switched to a ready state.

FIG. 1 shows a conventional device for locking a protective door 2. This device includes a momentary contact switch 4, a device for recognizing that the door(s) is/are closed, and an electromechanical lock 8. The momentary contact switch 4 is located on a door handle 10 of the protective door 2. The functionality of the momentary contact switch 4 can also be implemented using other devices. The functionality of the momentary contact switch can also be implemented at other locations of the industrial machine, for example in a machine control panel. The electromechanical lock 8, in particular the protective door lock, has an actuator 12 and a receiving device 14 adapted to engage with the actuator 12. In the illustrated embodiment, the actuator 12 can move in an axial direction as indicated by a double arrow 16. The actuator 12 is moved by an electric device 18. In the locked state, the actuator 12 is located inside the corresponding receiving device 14, which in the simplest case is a plate 20 with an opening 22. A sensor device 6, such as a protective door contact 6, is also closed in the locked state, indicating that the protective door 2 is indeed closed.

If the protective door 2 is to be opened, then the command "Move machine/process into a safe state" is triggered using the momentary contact switch 4 on the protective door 2. In response to the command "Move machine/process into a safe state", the electric device 18 of the electromechanical door lock 8 receives a control signal to move the actuator 12 away from the receiving device 14 in an axial direction. After the receiving device 14 is released, the protective door 2 can be opened and withdraws from the protective contact 6. The "open" and "close" motion of the protective door 2 is indicated by another double arrow 24.

If an industrial machine, for example an injection molding machine, includes several protective doors 2 and 26 (see FIGS. 2 and 3), then each protective door 2 and 26 is provided with a device of the type described with reference to FIG. 1 for locking the protective door 2 and/or 26. On an injection molding machine, the two protective doors 2 and 26 are referred to as "mold closing door" and "ejector door". It can be technically complex and expensive to protect an operator of such an injection molding machine.

It would therefore be desirable to provide a device than can simultaneously lock several protective doors of an industrial machine.

SUMMARY OF THE INVENTION

According to one aspect of the invention, at least two protective doors of an industrial machine, in particular an injection molding machine, can be locked simultaneously with a single locking device which includes a momentary contact switch, a device for recognizing a closed state of the protective door and a mechanical lock having an actuator with an associated receiving device, wherein one of the protective doors has at least one non-energizable actuator whose corresponding receiving device is associated with the second protective door.

This device advantageously eliminates for each additional protective door one electromechanical lock, one device for recognizing the locked state and one momentary contact switch. This design reduces the wiring cost and obviates the need for additional digital inputs and outputs of a machine controller. However, when using this particular device of the invention, the protective door that is equipped with the non-energizable actuator and the electromechanical lock, must be the last protective door closed, since this door is responsible for locking the other protective doors.

According to another aspect of the invention, a device for locking at least two protective doors of an industrial machine, in particular an injection molding machine, includes a momentary contact switch, a device for recognizing a closed state of the protective doors and a mechanical lock having an actuator with an associated receiving device. The actuator includes a transfer device with at least two additional actuators that engage with corresponding receiving devices that are each associated with a protective door.

With this arrangement, several protective doors can be locked simultaneously with a single electromechanical locking device. The transfer device transfers the locking motion of the actuator of the electromagnetic lock to additional spatially separated actuators. This locking device for locking several protective doors also reduces the number of additional components and the technical complexity. Unlike the first device, this device does not require that the protective doors are locked in a particular sequential order. The electromechanical locking device is only actuated after all protective doors are locked, locking all protective doors simultaneously, independent of their spatial arrangement.

Embodiments of the invention may include one or more of the following features. The energizable actuator and the at least one non-energizable actuator are implemented as a bolt, with the receiving device being in form of an opening. A sensor device can be disposed on at least one of the protective doors for recognizing a closed state of the at least two protective doors. The sensor device, which can be a protective contact, and the mechanical lock can be arranged on opposite sides of a protective door.

The transfer device can include a plate, for example a plate having a triangular shape, in with case the at least two additional actuators can be arranged on the side of the plate that faces away from the energizable actuator.

The device can advantageously be used with an injection molding machine that has as one of the protective doors a closing door and as another one of the protective doors a discharge door.

Further features and advantages of the present invention will be apparent from the following description of preferred embodiments and from the claims.

BRIEF DESCRIPTION OF THE DRAWING

The following figures depict certain illustrative embodiments of the invention in which like reference numerals refer to like elements. These depicted embodiments are to be understood as illustrative of the invention and not as limiting in any way.

DETAILED DESCRIPTION OF PREFERRED EMBODIMENTS

Figure 1:
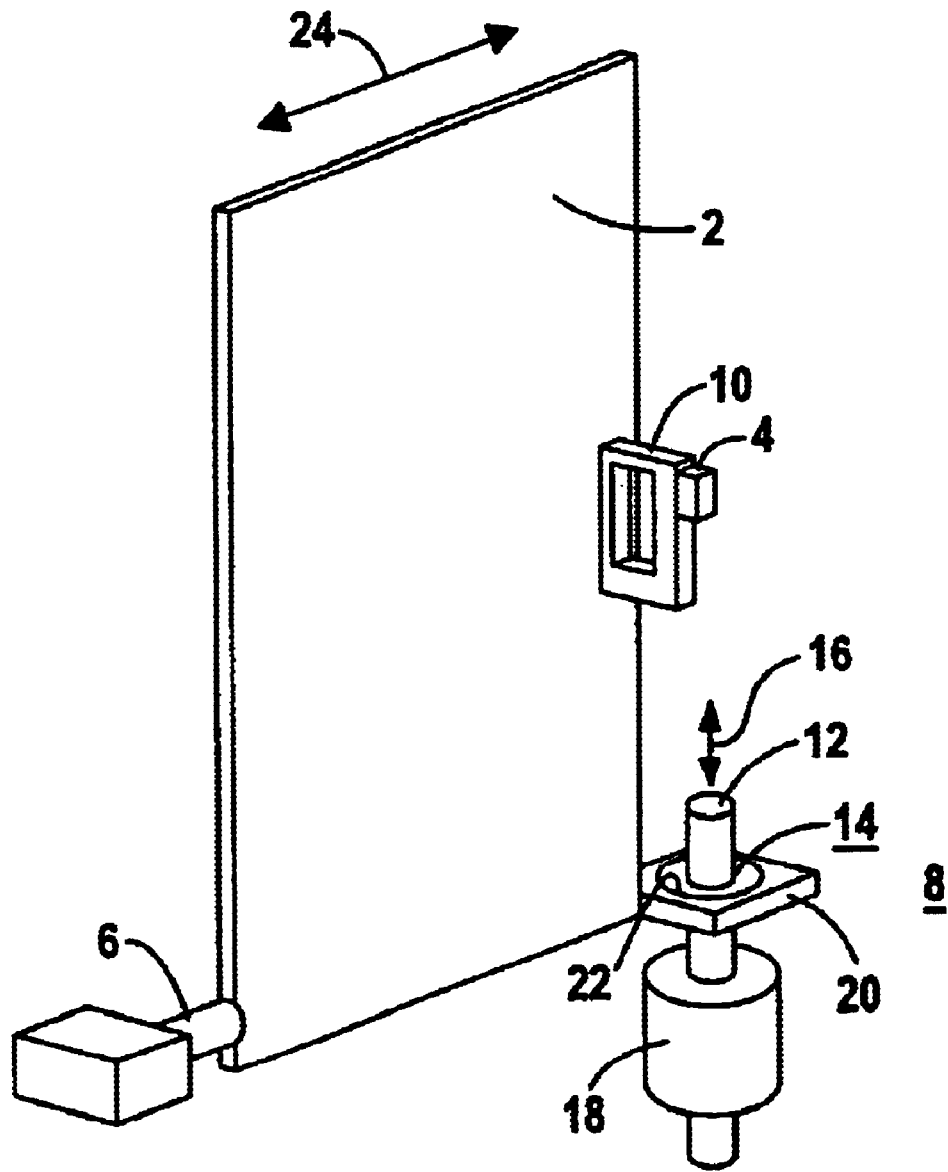
FIG. 1 shows a conventional device for locking a protective door.

The invention is directed to a device for locking at least two protective doors of an industrial machine. Unlike the conventional protective door depicted in FIG. 1, the first protective door 2 of FIG. 2 has an actuator 28 that is affixed to the first protective door 2 and is not energized. The second protective door 26 has a corresponding receiving device 30 for receiving the actuator 28, for example, in form of an opening 30, that is integrated in the door 26. The direction in which the second protective door 26 can move is also depicted by a double arrow 46, which in this embodiment is oriented perpendicular to the direction of motion 24 of the first protective door 2. The second protective door 26 is locked by the non-energizable actuator 28 as soon as the first protective door 2 is closed. This is sensed by the protective contact 6 which effects actuation of the electromechanical lock 8. Locking the first protective door 2 automatically also locks the second protective door 26. To lock both protective doors 2 and 26, the two protective doors 2 and 26 have to be closed in a particular order.

Figure 2:
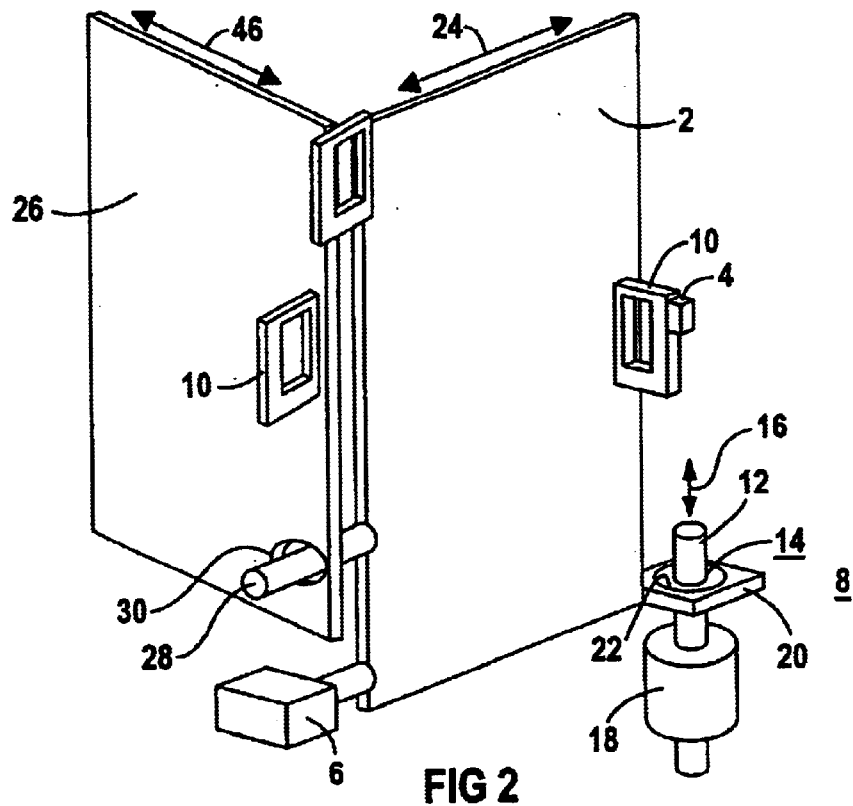
FIG. 2 shows a first embodiment of a device according to the invention.
Figure 3:
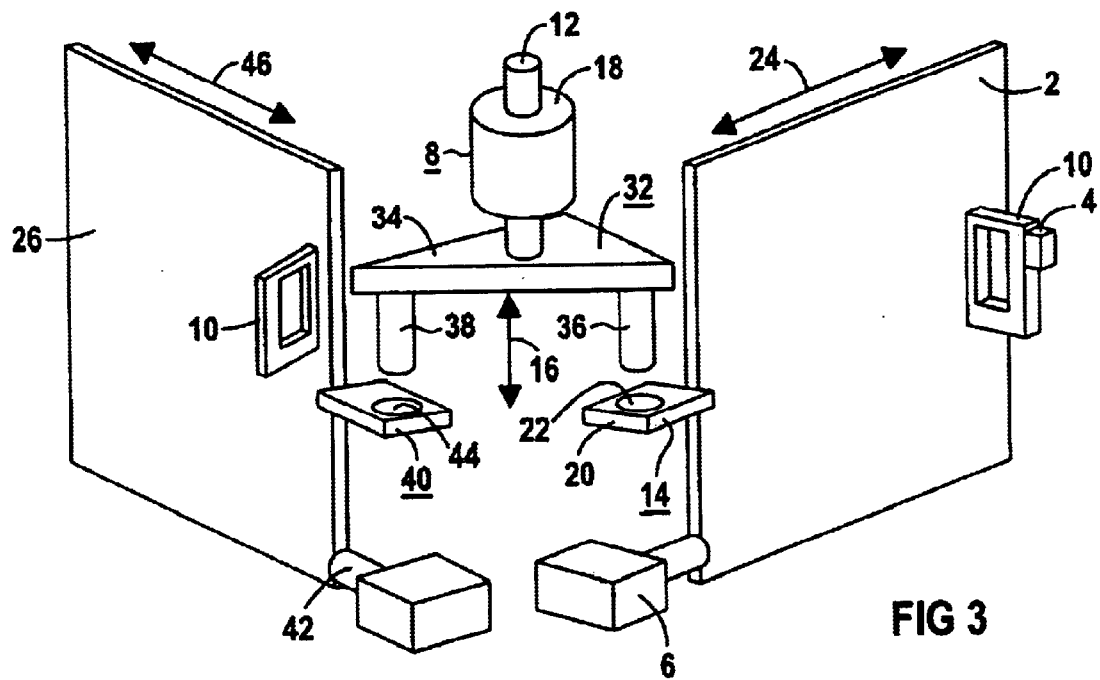
FIG. 3 shows a second embodiment of a device according to the invention.

FIG. 3 shows a second embodiment of the device of the invention for locking at least two protective doors 2 and 26, wherein the two protective doors 2 and 26 do not have to be closed in a particular order. Unlike the first embodiment of FIG. 2, the actuator of the electromechanical lock 8 of FIG. 3 includes a transfer device 32. The transfer device 32 has a plate 34 and two additional non-energizable actuators 36 and 38. The illustrated plate 34 of transfer device 32 is triangular, but the shape of the plate 34 is not important for the invention. The two additional non-energizable actuators 36 and 38 are arranged on the side of the plate 34 that faces away from the actuator 12 of the electromagnetic lock 8. Each of the protective doors 2 and 26 include corresponding receiving devices 14 and 40, respectively.

The transfer device 32 transfers the locking motion of the actuator 12 of the electromechanical lock 8 to additional actuators 36 and 38. The specific design of the transfer device 32 depends on particular placement of the protective doors 2 and 26 on an industrial machine. Alternatively, a mechanical linkage made of rods, joints, sheaves, pulleys, etc., can also be used instead of the plate-shaped transfer device 32.

Unlike the embodiment of device according to FIG. 1, in the embodiment illustrated in FIG. 3 of the device, each protective door 2 and 26 has its own sensor device 6 and 42 for sensing a closed state of the respective protective door. In the illustrated diagram, the two sensor devices 6 and 46 are each implemented as a protective contact. A light barrier can also be used as sensor device 6 and/or 42. When the sensor devices 6 and 46 indicate that both protective doors 2 and 26 are closed, the electromechanical lock 8 is controlled so as to displace the actuator 12, with the device 32 attached on its end face, in an axial direction, causing the additional actuators 36 and 38 to penetrate into the opening 22 and 44 of the corresponding receiving devices 14 and 40. Accordingly, the single electromagnetic protective door lock 8 can lock two protective doors 2 and 26 simultaneously.

The two protective doors 2 and 26 of an industrial machine can also be arranged in-line (not shown), with the two protective doors 2 and 26 then closing by moving against each other. Each of the two protective doors 2 and 26 can also represent a protective door leaf of a two-piece protective door of an industrial machine. Such a two-piece protective door is used where space for opening the door is limited.

While the invention has been disclosed in connection with the preferred embodiments shown and described in detail, various modifications and improvements thereon will become readily apparent to those skilled in the art. The device depicted in FIGS. 2 and 3 be used with any type of door tracks and can lock at least two protective doors 2 and 26 regardless of their shape and regardless of how the doors 2 and 26 close and open. For example, the protective door of a knitting machine can be made in two pieces, with each of the door halves having the form of a partial cylinder. The door halves of this type of protective door move on curved sliding tracks. Accordingly, the spirit and scope of the present invention is to be limited only by the following claims.

What is claimed as new and desired to be protected by Letters Patent is set forth in the appended claims and their equivalents:

1. A device for locking at least two protective doors of an industrial machine, in particular an injection molding machine, comprising:
    an electro-mechanical interlock having an actuator and a receiving device adapted to engage with the actuator, said electro-mechanical interlock associated with a first door;
    a sensing device for sensing a closed state of the first door;
    a bolt-shaped locking element affixed to the first door; and
    a second door having an opening,
    wherein the bolt-shaped locking element affixed to the first door engages with the opening in the second door and the sensing device and the electro-mechanical interlock are disposed on opposite sides of the first door.

2. The device of claim 1, and further comprising a contact switch for controlling engagement between the actuator and the receiving device.

3. The device of claim 2, wherein the contact switch is remote from the device.

4. The device of claim 2, wherein the contact switch is disposed on the first or second door.

5. The device of claim 1, wherein the sensing device includes a protective contact.

6. The device of claim 1, wherein the receiving device forms an integral part of the first door.

7. The device of claim 1, wherein the receiving device is attached to the first door.

8. The device of claim 1, wherein the receiving device includes an opening.

9. The device of claim 1, wherein the actuator is energized by an electromagnetic force.

10. Use of the device according to claim 1 with an injection molding machine, wherein one of the at least two doors operates as a closing door and another one of the at least two doors operates as a discharge door.

* * * * *